(No Model.)
G. W. SNYDER.
THILL SHIFTER FOR VEHICLES.
No. 567,817. Patented Sept. 15, 1896.
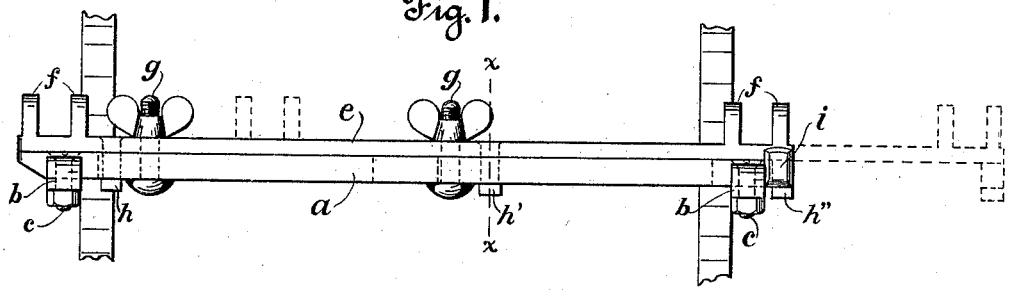
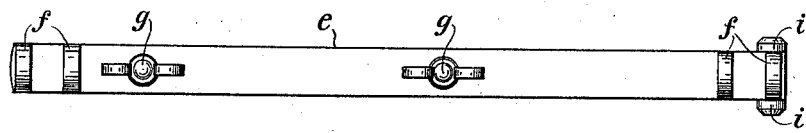
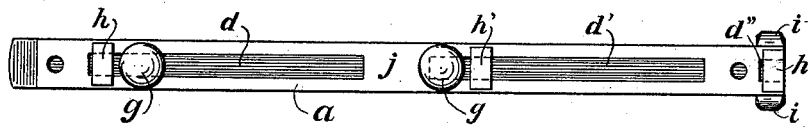
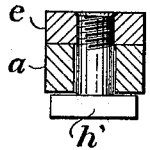
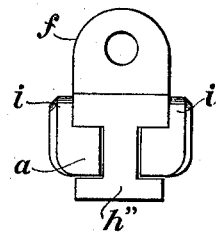
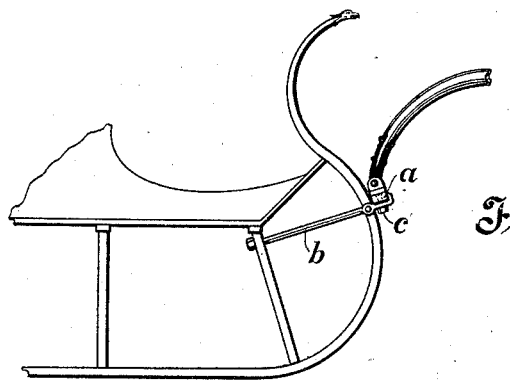
Witnesses
A. S. Oliver
H. H. Mills.
Inventor
George W. Snyder
by Eugene Diven
Attorney

UNITED STATES PATENT OFFICE.

GEORGE W. SNYDER, OF ELMIRA, NEW YORK, ASSIGNOR OF ONE-HALF TO PATRICK SULLIVAN, OF SAME PLACE.

THILL-SHIFTER FOR VEHICLES.

SPECIFICATION forming part of Letters Patent No. 567,817, dated September 15, 1896.

Application filed February 26, 1896. Serial No. 580,802. (No model.)

*To all whom it may concern:*

Be it known that I, GEORGE W. SNYDER, a citizen of the United States, residing at Elmira, in the county of Chemung and State of New York, have invented certain new and useful Improvements in Thill-Shifters, of which the following is a specification.

My invention relates to improvements in the construction of the adjustable support connecting the thills with the running part of a vehicle, by means of which the thills may be shifted to one s'de of their central position when it is desired that the horse shall travel in the side track made by the vehicle, such an attachment being especially useful on sleighs drawn by one horse over country roads; and the objects of my invention are to construct a light, strong, and quickly-operated device, to provide safety attachments which will hold the two parts together in case the clamps become loose, and, finally, to provide simple means whereby to strengthen the sliding bar without unnecessarily increasing its weight. I attain these objects by the construction shown in the accompanying drawings, in which—

Figure 1 is a front view of the thill-shifter as attached to the runners of a sleigh. Fig. 2 is a top view of the shifter. Fig. 3 is a bottom view of the same. Fig. 4 is a sectional view on the line $x\ x$, Fig. 1, showing the construction of the safety attachments. Fig. 5 is an end view to the right in Fig. 1, showing my strengthening guards or lugs; and Fig. 6 shows the manner of attaching my thill-shifter to a sleigh.

Similar letters refer to similar parts throughout the several views.

The slotted bar $a$ is rigidly attached in front of the runners of a sleigh, as indicated in Figs. 1 and 6. A rod $b$ is bolted to the front knee of the sleigh, extends forward, where it is bolted to the side of the runner, and projects sufficiently in front of the runner to form a support to which the bar $a$ is bolted by means of the countersunk bolts $c$ $c$, the end of this projection being turned up in front of the bar $a$ to add strength to the attachment. The bar $a$ is provided with three slots $d$, $d'$, and $d''$. Upon the bar $a$ rests the sliding bar $e$, provided at its ends with the eyed clips $f\ f$, to which the thills are coupled. Two clamping-bolts $g\ g$, provided with thumb-nuts, are located in the slots $d\ d'$ and pass up through appropriate holes in the sliding bar $e$.

Two T-headed bolts $h\ h'$ are screwed into the bar $e$, as shown in Fig. 4, being riveted in after they are screwed home, and the right-hand end of the bar $e$ is provided with a third T-piece $h''$, which may be forged upon it, as I propose to make these bars of iron or steel. The T-pieces $h\ h'$ slide in the slots $d\ d'$, and the T-piece $h''$ slides into the slot $d''$ when the bar $e$ is shifted to its central position. These T-pieces fit loosely in their slots, so that there will be no tendency to bind after the thill-shifter is painted. Their function is to prevent the bar $e$ from being pulled away from the bar $a$ in case the clamp-bolts become loose or drop out from carelessness or other cause.

The piece $h''$ has an additional function. It will be noticed that the right-hand end of the bar $e$ has no fastening to the bar $a$ from the point $h'$ outward, and there is a tendency for it to spring upward, which the piece $h''$ in the slot $d''$ prevents. There is also a tendency for the bar $e$ to be sprung forward or backward from the point $h'$, and to obviate this I form the lugs or guards $i\ i$ upon the right-hand end of the bar $a$. As these lugs are at the extreme end of the bar $a$, they are of much service when the bar $e$ is shifted to one side, as indicated by broken lines in Fig. 1, since they shorten by four or five inches the end that extends unprotected.

Additional stiffness may be secured for the bar $a$ by attaching braces from the sleigh to the central solid portion $j$ of the bar.

In operation, the driver may, without getting out of the sleigh, reach over the dashboard and manipulate the thumb-nuts, so that the thills may be shifted to the side or back again, as desired.

My device is applicable alike to vehicles having wheels or runners, but is especially adapted for use upon single sleighs used on country roads, where it may be desirable to have the horse-track in line with one of the runners instead of the middle of the road.

I am aware that thill-shifters have been made with the sliding part held to the other part by bolts and thumb-nuts, the under part being provided with slots to receive the bolts, and I am also aware of others, the two parts of which are held together by straps and set-screws. By my construction I provide simple means for securing a safe and strong connection of the two parts and do away with straps and the like, which mar the paint during adjustment and become clogged with paint and dirt, so as to make it hard to shift the one part upon the other.

While I have specified steel or iron as the preferred material of which to make the parts of my thill-shifter, I do not wish to be confined to those materials, neither do I wish to be limited to the exact construction and means of attachment as set forth herein.

What I do claim as my invention, and desire to secure by Letters Patent, is—

1. In a thill-shifter, the combination of a slotted bar adapted to be attached to a vehicle, a sliding bar to which the thills are coupled resting upon the slotted bar, bolts located in the slots for clamping the bars together, and independent safety-pieces attached to the sliding bar and passing through the slots in the stationary bar, substantially as described and for the purpose set forth.

2. In a thill-shifter, the combination of a stationary bar adapted to be attached to a vehicle and provided with a slot in one end, a sliding bar to which the thills are coupled resting upon the stationary bar and provided at its corresponding end with a projection adapted to enter the slot in the stationary bar and headed over to engage the under side of said bar, and clamps for holding the bars in proper adjustment.

3. In a thill-shifter, the combination of a stationary bar adapted to be attached to a vehicle, a sliding bar to which the thills are coupled resting upon the stationary bar, lugs extending upward from the end of the stationary bar toward which the sliding bar shifts, said lugs being located on either side of the sliding bar to form lateral supports therefor, and means for clamping said bars in proper adjustment.

4. In a thill-shifter, the combination of a stationary bar adapted to be attached to a vehicle, a sliding bar to which the thills are coupled resting upon the stationary bar, bolts extending upward through slots in the stationary bar and through holes in the sliding bar, thumb-nuts to tighten the bolts, T-shaped safety-pieces also extending upward through said slots and rigidly attached to the sliding bar, and lugs at the end of the stationary bar toward which the sliding bar shifts, said lugs forming lateral supports for the sliding bar.

In testimony whereof I have affixed my signature in presence of two witnesses.

GEORGE W. SNYDER.

Witnesses:
A. S. DIVEN,
HOLLIS H. MILLS.